US00RE35685E

United States Patent [19]

Schmidt et al.

[11] E Patent Number: Re. 35,685

[45] Reissued Date of Patent: Dec. 9, 1997

[54] IMPACT PAD FOR A CONTINUOUS CASTER TUNDISH

[75] Inventors: Manfred Schmidt; Scott B. Newman, both of Bethlehem, Pa.

[73] Assignee: Bethlehem Steel Corporation

[21] Appl. No.: 347,975

[22] Filed: Dec. 1, 1994

Related U.S. Patent Documents

Reissue of:

[64] Patent No.: 5,169,591
Issued: Dec. 8, 1992
Appl. No.: 832,520
Filed: Feb. 7, 1992

[51] Int. Cl.[6] ..... B22D 41/02

[52] U.S. Cl. ..... 266/275; 266/227

[58] Field of Search ..... 266/275, 280, 266/286, 287, 227, 229, 44; 164/437, 337, 335; 222/591, 594

[56] References Cited

U.S. PATENT DOCUMENTS

| | | | |
|---|---|---|---|
| 3,887,171 | 6/1975 | Neuhaus | 164/437 |
| 4,042,229 | 8/1977 | Eccleston | 266/275 |
| 4,177,855 | 12/1979 | duchateau et al. | 164/82 |
| 4,339,115 | 7/1982 | Daussan et al. | 266/280 |
| 4,383,570 | 5/1983 | White | 164/57.1 |
| 4,632,368 | 12/1986 | Podrini | 266/229 |
| 4,653,733 | 3/1987 | Bugajski et al. | 266/275 |
| 4,671,499 | 6/1987 | Ishiyama et al. | 266/275 |
| 4,711,429 | 12/1987 | Diederich et al. | 266/44 |
| 4,715,586 | 12/1987 | Schmidt et al. | 266/275 |
| 4,739,972 | 4/1988 | Podrini | 266/44 |
| 4,770,395 | 9/1988 | Thanh et al. | 266/275 |
| 4,776,570 | 10/1988 | Vo Thanh et al. | 266/229 |
| 4,852,632 | 8/1989 | Jackson et al. | 164/437 |
| 4,909,484 | 3/1990 | Sutor et al. | 266/44 |
| 4,993,692 | 2/1991 | Brown et al. | 266/229 |
| 5,072,916 | 12/1991 | Soofi | 266/275 |
| 5,131,635 | 7/1992 | Soofi | 164/437 |
| 5,133,535 | 7/1992 | Soofi | 164/437 |
| 5,139,239 | 8/1992 | Eccleston | 164/437 |
| 5,160,480 | 11/1992 | Vassilicos | 164/437 |
| 5,188,796 | 2/1993 | Soofi | 266/227 |
| 5,358,551 | 10/1994 | Saylor | 75/584 |

FOREIGN PATENT DOCUMENTS 2643009 8/1976 Germany .

OTHER PUBLICATIONS

Premier Refractories, Blueprint—Drawing No. SK 276, Sep. 30, 1991.

Continuous Casting, vol. 1, Iron & Steel Society of AIME Dec. 1983 pp. 99–112, Water Modeling—A Viable Production Tool, D. J. Harris, et. al.

33 Metal Producing, Sep. 1994, pp. 21–23, and 47, "Taming the Thunder" by Jo Isenberg–O.Loughlin.

Paper given at an AIME Conference, (04)–Spring 1994, pp. 198–199. "Development of a Turbulence Inhibiting Pouring Pad/Flow Control Device for a Tundish" by D. Bolger.

*Primary Examiner*—Scott Kastler
*Attorney, Agent, or Firm*—Harold I. Masteller, Jr.; Joseph W. Berento, III

[57] ABSTRACT

An impact pad for eliminating surface turbulence in a continuous caster tundish, the impact pad having a base for receiving an incoming ladle stream, and one or more sidewalls extending in an upward direction along the periphery of the base. Each upward extending sidewall includes an inner surface having an undercut portion facing the incoming ladle stream. And, each undercut portion extends along the length of the inner surface, and comprises a shaped surface for receiving and reversing the direction of a fluid flow generated by the incoming ladle stream.

47 Claims, 3 Drawing Sheets

IMPACT PAD FOR A CONTINUOUS CASTER TUNDISH

Matter enclosed in heavy brackets [ ] appears in the original patent but forms no part of this reissue specification; matter printed in italics indicates the additions made by reissue.

BACKGROUND OF THE INVENTION

This invention is directed to apparatus for reducing surface turbulence in a molten metal bath, and more particularly, to impact pads for controlling the fluid flow pattern of an incoming ladle stream for the purpose of reducing surface turbulence within a continuous caster tundish.

Tundishes, located between the ladle delivering liquid steel to the caster floor and the continuous caster mold, are large containers for holding a reservoir of liquid steel. The liquid steel is transferred from the ladle through a ladle shroud extending into the tundish, and the liquid steel is fed at a continuous or semicontinuous flow rate controlled by a stopper rod, or by a slide gate assembly.

Extensive water flow-model studies have been made throughout the steelmaking industry to simulate liquid steel fluid flow patterns within an actual tundish. These water flow-models have been beneficial in determining critical areas of tundish design such as depth of bath, well block locations, and placement of fluid flow control devices within the tundish. As a result of these studies, it is well-known that the fluid flow generated by the incoming ladle stream is reflected from the flat tundish floor toward the surface of the liquid steel. This generated fluid flow, causes a turbulent boiling action and extensive wave motion at the surface of the steel bath. Additionally, where the fluid flow forces are obstructed by structural barriers such as tundish side and end walls, the ladle stream fluid flow surges upward, along such barriers, and causes excessive turbulence at the surface of the liquid steel bath. The excessive turbulence produced by the upward surge breaks up the tundish flux cover, and produces a downward surge around the ladle shroud. The broken flux cover allows the liquid steel to be exposed to the atmosphere which sets up conditions conducive to altering the chemistry of the steel bath. The chemical changes typically involve loss of aluminum from the bath and/or absorption of oxygen and nitrogen into the steel. The downward, shear flow of the liquid steel swirling around the ladle shroud, entraps particles from the broken slag cover within the ladle stream.

Surface requirements, and cleanliness standards for modern high quality steel products, dictate that impurities and chemical changes can not be tolerated within the product. Heretofore, there have been various attempts to reduce or eliminate surface turbulence within a continuous caster tundish to improve the quality of the finished steel product. These attempts have included a wide assortment of dams and weirs which redirect the ladle stream fluid flow away from the surface of the bath. One such attempt, comprising wall dams extending along the tundish sidewalls near the surface of the liquid steel bath, is disclosed in Applicant's prior U.S. Pat. No. 4,715,586 granted Dec. 29, 1987. Although many past fluid flow control devices have been somewhat successful in controlling fluid flow and reducing surface turbulence, they tend to cause operational problems. Caster operators have found that wall dams are difficult and expensive to install and maintain. The operators have also discovered, that because of their location within the tundish, and because of their high profiles, the past flow control devices interfere with tundish deskulling apparatus, and are damaged, or destroyed during the deskulling operations.

SUMMARY OF THE INVENTION

It is therefore an object of this invention to provide a fluid flow control device for reducing surface turbulence in the vicinity of the ladle shroud in a continuous caster tundish.

It is a further object of this invention to provide a fluid flow control device to prevent breakup of the tundish flux cover, and reoxidation of the liquid steel bath.

It is a further object of this invention to provide a fluid flow control device to prevent slag entrainment within the liquid steel bath.

It is a further object of this invention to provide a fluid flow control device for receiving and reversing the direction of the radiating fluid flow generated by an incoming ladle stream.

It is a further object of this invention to provide a fluid flow control device which is easily installed in the flat bottom portion of a continuous caster tundish.

It is still a further object of this invention to provide a fluid flow control device which can be easily replaced during refurbishing of the tundish.

We have discovered that the foregoing objects can be attained with an impact pad having a base for receiving an incoming ladle stream, and one or more sidewalls extending in an upward direction along the periphery of the base. Each upward extending sidewall includes an inner surface having an undercut portion facing the incoming ladle stream. Each undercut portion extends along the length of the inner surface, and each undercut portion comprises a shaped surface for receiving and reversing the direction of a fluid flow generated by the incoming ladle stream.

BRIEF DESCRIPTION OF THE DRAWINGS

FIG. 3b is a front perspective view taken along the line 3b—3b of FIG. 3a.

FIG. 6b is a perspective view taken along the line 6b—6b of FIG. 6a.

DETAILED DESCRIPTION OF THE PREFERRED EMBODIMENT

The overall geometry of a continuous caster tundish is dictated by the location and number of strands within the casting machine. A rectangular, or a "Bathtub" shaped tundish, is customarily used with a single strand caster, and a trough shaped tundish is generally used for a multiple strand caster. Likewise, the location of the well blocks, and the tundish impact pad, is also determined by the casting machine design.

Figure 4:
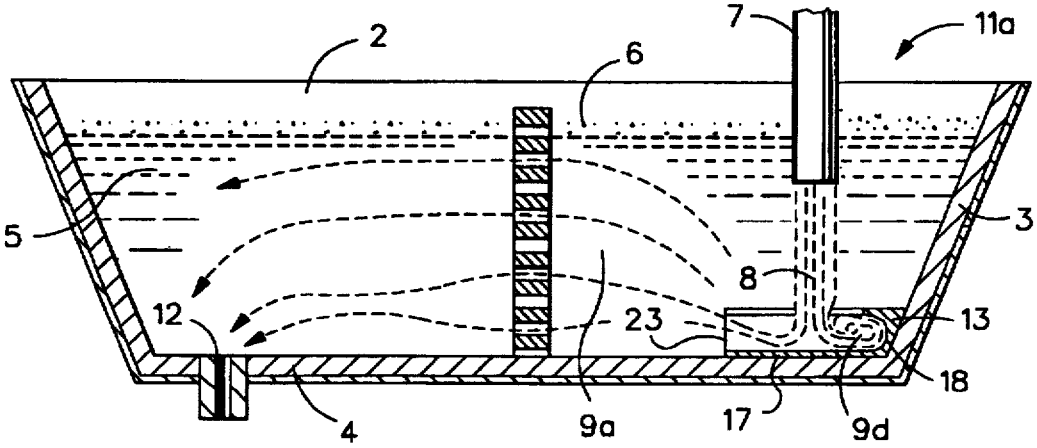
FIG. 4 is a longitudinal cross-section view through a single strand caster tundish showing the preferred embodiment of the impact pad invention.

Referring to FIG. 4 of the drawings, a tundish 11a for a single strand caster, is shown having a well block 12 at one end of the tundish, and an impact pad 13 positioned adjacent to the end wall 3 at the end opposite the well block. This tundish arrangement produces an asymmetrical fluid flow 9a within the reservoir of liquid steel 5.

Figure 10:
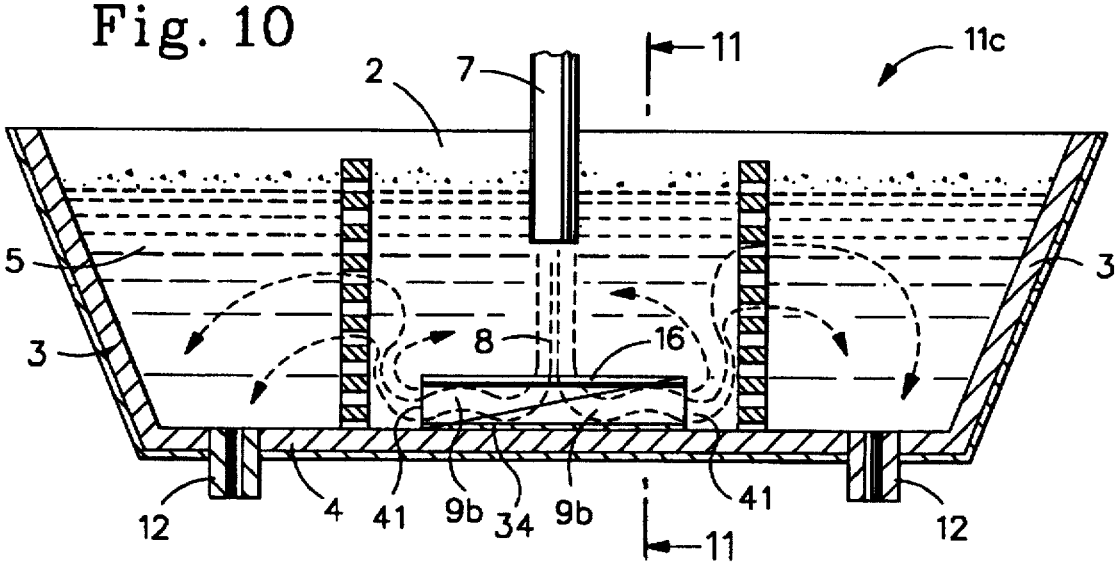
FIG. 10 is a longitudinal cross-section view through a multiple strand caster tundish showing the preferred impact pad invention for use with a symmetrical fluid flow pattern.
Figure 11:
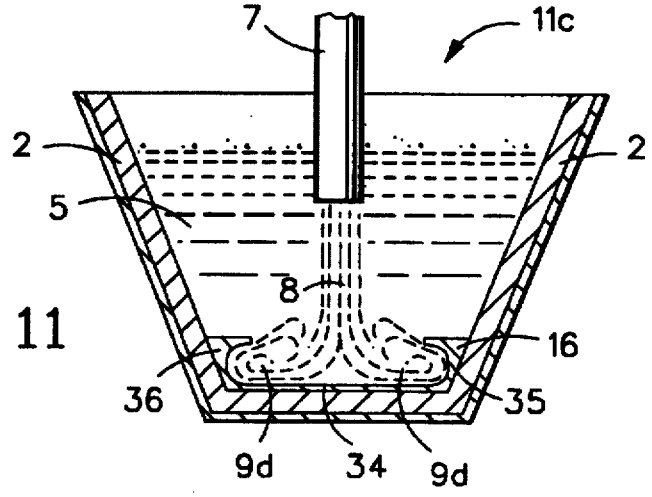
FIG. 11 is a transverse cross-section view taken along the lines 11—11 of FIG. 10.

FIGS. 10 and 11 illustrate a tundish 11c for a multiple strand caster. The tundish well blocks 12 are spaced apart along the length of the tundish floor 4, and the tundish impact pad 16 is located between adjacent well blocks 12. This tundish arrangement produces a symmetrical fluid flow shown at 9b.

Figure 5:
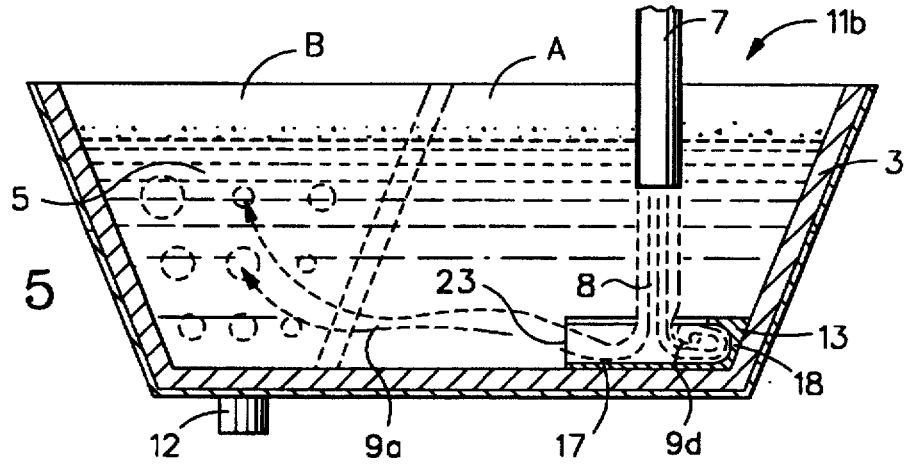
FIG. 5 is a longitudinal cross-section view through a multiple strand "T" shaped tundish showing the preferred embodiment of the impact pad invention.

A variation of the multiple strand tundish comprises a "T" shaped reservoir shown as 11b in FIG. 5. Tundish 11b is comprised of two trough shaped reservoirs arranged perpendicular to each other. One end of the first trough shaped reservoir A, interects the second reservoir B. The opposite end portion of reservoir A includes an impact pad 13 adjacent end wall 3. In this tundish arrangement, the incoming ladle stream generates an asymmetrical fluid flow 9a, similar to the fluid flow shown in FIG. 4.

Figure 1:
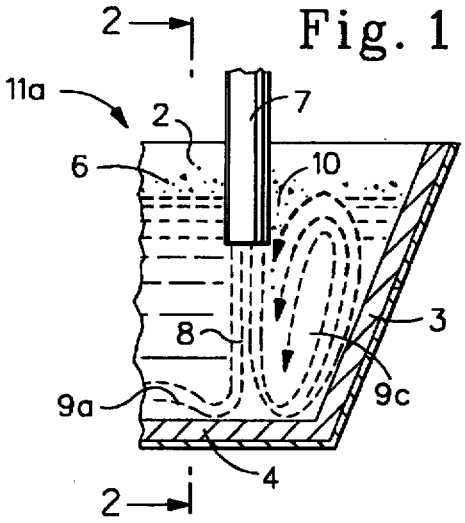
FIG. 1 is a longitudinal cross-section view of a water flow-model study tundish having an asymmetrical fluid flow pattern.
Figure 2:
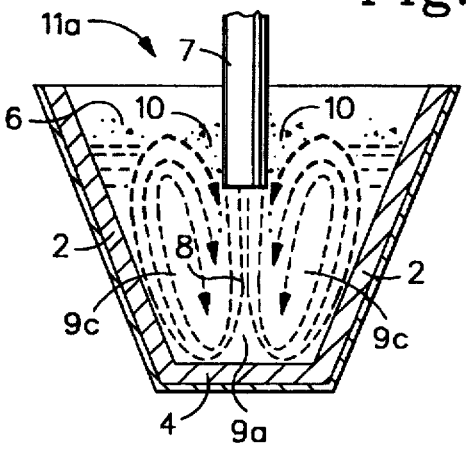
FIG. 2 is a transverse cross-section view taken along the lines 2—2 of FIG. 1.
Figure 3A:
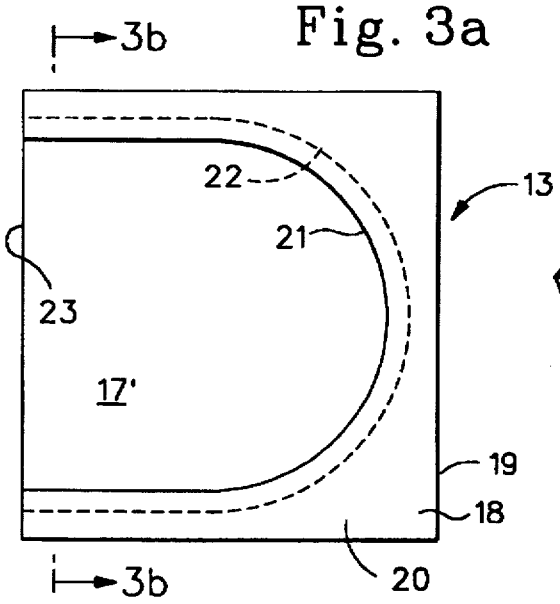
FIG. 3a is a plan view showing the preferred embodiment of the impact pad invention for use in a tundish having an asymmetrical ladle stream fluid flow pattern.
Figure 3B:
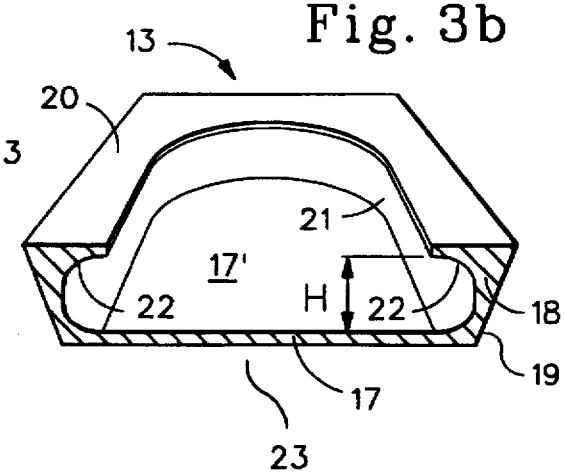

Referring to FIGS. 1 and 2, water flow-model studies have shown that the fluid flow, generated by an incoming ladle stream, is reflected from the flat tundish floor 4 in an upward direction toward the surface of the liquid steel. If this fluid flow is restricted by the tundish walls, the restricted fluid flow is forced upward along the surface of such walls, and the resulting upward surge causes a boiling wave motion at the surface of the steel bath.

FIG. 1 illustrates a single strand tundish 11a having an asymmetrical fluid flow 9a. The ladle shroud 7 is shown adjacent end wall 3 opposite the well block 12. End wall 3 obstructs the fluid flow 9a, and the restricted forces cause an upward fluid flow surge along end wall 3. This upward flow follows a circular path 9c, and comprises an upward surge along the face of wall 3, and a downward flow around the ladle shroud 7. The upward surge of circular flow 9c causes excessive turbulence at the surface of the bath, breaks up a protective flux or slag cover 6, and exposes the liquid steel to the outside atmosphere, thereby creating conditions for possible uncontrolled chemical changes within the liquid steel bath. The downward flow around the ladle shroud generates shear and vortices and pulls broken particles 10, from the flux cover 6, down into the liquid steel bath, creating inclusions within the finished steel product.

As shown in FIG. 2, water flow-model studies have also shown that the sidewalls 2 of tundish 11a also restrict the fluid flow generated by the ladle stream. The restrictive sidewalls 2 cause similar circular fluid flows 9e which further intensify surface turbulence and break up of the protective flux cover 6.

Referring to FIGS. 3a through 5 of the drawings, an impact pad 13, for use in a tundish having an asymmetrical fluid flow 9a, is shown located adjacent the end wall 3 of a tundish and positioned below the ladle shroud 7. The impact pad, which is a refractory shape, includes a base 17 having an erosion resistant top surface for receiving the incoming ladle stream 8. Impact pad 13 further includes a sidewall 18 extending in an upward direction along the periphery of base 17. Sidewall 18 partially encircles the incoming ladle stream 8 providing an open side 23 along one edge of the impact pad adjacent well blocks 12.

Sidewall 18 includes an inclined outer surface 19 contiguous with the tundish walls, a top surface 20 having a semi-circular or "C" shaped, serpentine edge partially encircling the ladle stream 8, and an inner surface 21 facing the incoming ladle stream. Sidewall 18 further includes a curvilinear undercut portion 22 having a shaped surface capable of reversing the direction of the fluid flow 9a. Undercut 22 extends along the length of the inner surface 21 below top surface 20, and undercut 22 has one end tangent to top surface 17' of base 17. In order to achieve effective control over the fluid flow generated by the incoming ladle stream, the height "H", of the curvilinear undercut, is ≧ the inside diameter of the shroud delivering the liquid steel into the tundish.

As shown in FIGS. 4 and 5, the incoming ladle stream 8 falls onto the base top surface 17', generates a radial asymmetrical fluid flow 9a, and emanates toward the impact pad sidewall 18. The curvilinear undercut 22, extending along the inside surface 21 of sidewall 18, captures the fluid flow within its shaped surface, and forces the fluid flow into a reversed direction back toward the incoming ladle stream. The reversed fluid flow forms an eddy current 9d, which is gradually disbursed along the open side 23, toward the well blocks 12 at the opposite end of the tundish.

Figure 6A:
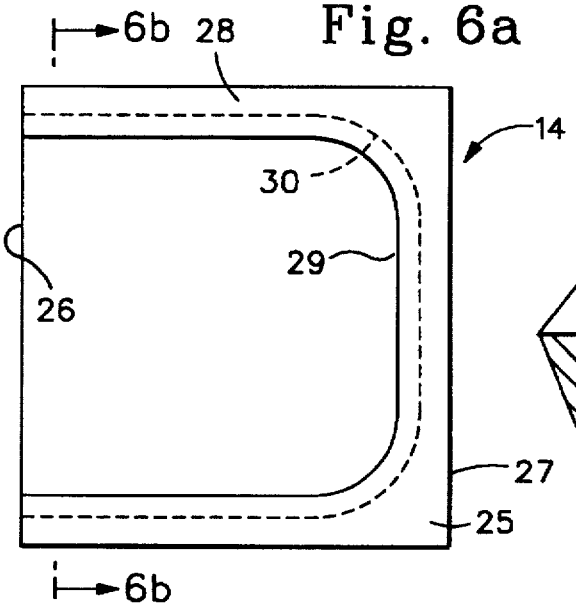
FIG. 6a is a plan view showing an alternate embodiment of the impact pad invention for use in a tundish having an asymmetrical fluid flow pattern.
Figure 6B:
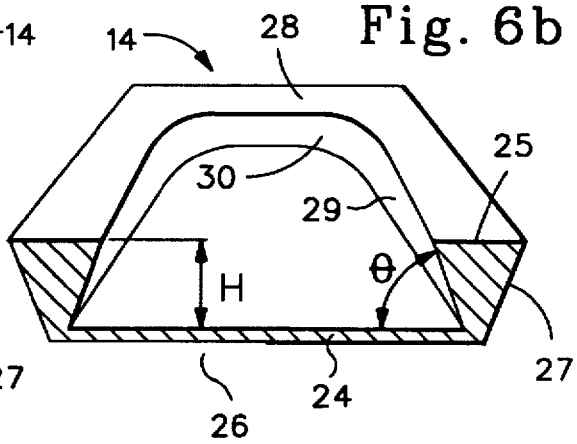
Figure 7:
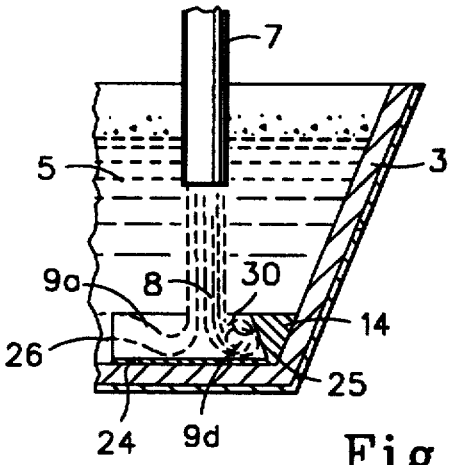
FIG. 7 is a longitudinal cross-section view through the end wall portion of a tundish showing the alternate embodiment of the impact pad invention for use in a tundish having an asymmetrical fluid flow pattern.

FIGS. 6a, 6b and 7, disclose an alternate impact pad embodiment for use in a tundish having an asymmetrical fluid flow 9a. The alternate impact pad 14 is shown adjacent a tundish end wall 3, and positioned below the ladle shroud 7 to receive the incoming ladle stream 8. The alternate impact pad embodiment comprises a refractory shape having a base 24, and a sidewall 25 extending in an upward direction along the periphery of base 24. Sidewall 25 partially encircles the incoming ladle stream 8 to provide an open side 26 along the edge of the impact pad adjacent well blocks 12.

The impact pad sidewall 25 includes an inclined outer surface 27 contiguous with the tundish walls, a top surface 28 having a "C" shaped, serpentine edge partially encircling the ladle stream 8, and an inner surface 29 facing the incoming ladle stream. The inner surface 29, of sidewall 25, is sloped at an angle θ in a downward direction from the serpentine edge, of top surface 28, toward the inclined outer surface 27 to provide a planar undercut 30. Angle θ is between 45° and 75°, and the planar undercut portion 30 extends along the length of the inner surface 29 below top surface 28. In order to achieve effective control over the fluid flow generated by the incoming ladle stream, the height "H", of the planar undercut, is ≧ the inside diameter of the shroud delivering the liquid steel into the tundish.

As shown in FIG. 7, planar undercut 30, extending along the inside surface 29 of sidewall 25, captures the fluid flow within its shaped surface, and forces the fluid flow into a reversed direction back toward the incoming ladle stream. The reversed fluid flow forms an eddy current 9d, which is gradually disbursed along the open side 26, toward the well blocks 12 at the opposite end of the tundish.

Figure 8:
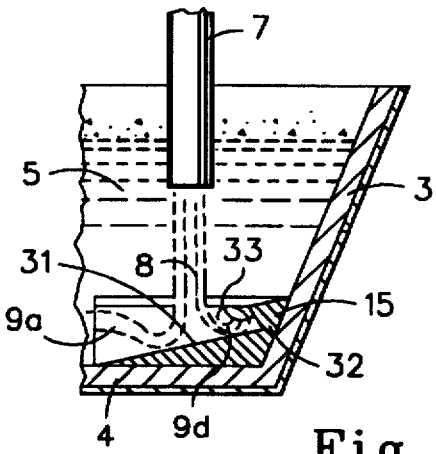
FIG. 8 is a longitudinal cross-section view through the end wall portion of a tundish showing a second alternate embodiment of the impact pad invention for use in a tundish having an asymmetrical fluid flow pattern.

A second alternate embodiment of the impact pad invention for use in a tundish having an asymmetrical fluid flow 9a, is shown as 15 in FIG. 8. Impact pad 15 is positioned adjacent tundish end wall 3 and below ladle shroud 7 to receive the incoming ladle stream 8. Impact pad 15 comprises a base having a top surface 31 sloped in a downward direction from the tundish end wall 3 toward the tundish floor 4. Impact pad 15 further includes a pad sidewall 32 extending in an upward direction along the periphery of the base. Sidewall 32 partially encircles the incoming ladle stream 8, and includes an inner surface having a planar undercut surface 33 similar to undercut 30, sloped in a downward direction at angle θ between 45° and 75°.

Figure 9:
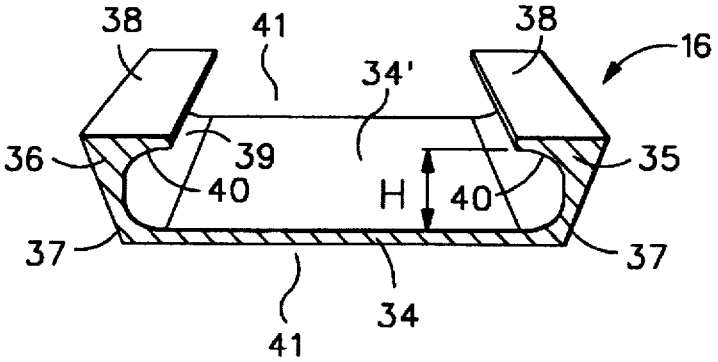
FIG. 9 is a front perspective view showing the preferred embodiment of the impact pad invention for use in a tundish having a symmetrical ladle stream fluid flow pattern.

FIGS. 9–11 illustrate the preferred embodiment of the impact pad invention for use in a continuous casting tundish having a symmetrical ladle stream fluid flow 9b. Impact pad 16 comprises a base 34 having an erosion resistant top surface 34', sidewalls 35 and 36 extending along opposite edges of base 34, and two open ends 41 located between the opposed pad sidewalls 35 and 36. Pad sidewalls 35 and 36 extend in an upward direction from their respective opposite base edge portions, and each pad sidewall, 35 and 36, includes an inclined outer surface 37 contiguous with a tundish wail, a top surface 38, and an inner surface 39 facing the incoming ladle stream. Each pad sidewall 35 and 36 further includes a curvilinear undercut portion 40 having a shaped surface capable of reversing the direction of the fluid flow 9d generated by the incoming ladle stream 8. Each undercut 40 extends along the length of inner surface 39 below top surface 38, and each undercut 40 has one end tangent to top surface 34' of base 34.

As shown in FIGS. 10 and 11 of the drawings, the inclined outer surface 37 of sidewalls 35 and 36 are positioned adjacent the tundish sidewalls 2. The incoming ladle stream 8 falls onto the base top surface 34', generates a radial symmetrical fluid flow, and emanates toward the impact pad sidewalls 35 and 36. The curvilinear undercut 40, extending along each inside surface 39 of sidewalls 35 and 36, captures the fluid flow within their shaped surface, and forces the fluid flow into a reversed direction back toward the incoming ladle stream. The reversed fluid flow forms eddy currents 9d, which are gradually disbursed along the open ends 41, toward the well blocks 12 spaced apart along the length of the tundish floor.

Although impact pad 16 has been shown to comprise a curvilinear undercut 40, it should be understood that the undercut portion could just as well comprise a sloped planar undercut as disclosed in FIGS. 6a–8.

And, although FIG. 10 shows only two well blocks, it should be understood that a casting machine for casting more than two continuous strands would require more than two well blocks spaced apart along the length of the tundish floor.

While this invention has been illustrated and described in accordance with a preferred embodiment, it is recognized that variations and changes may be made therein without departing from the invention as set forth in the claims.

We claim:

1. An impact pad for reversing the direction of a fluid flow generated by an incoming liquid stream, said impact pad comprising: a base having a surface against which said liquid stream impacts, a peripheral top surface to expose said base, and a sidewall extending in an upward direction along the periphery of said base, said sidewall extending between said base and said peripheral top surface and including;

a) a first end, a second end remote from said first end, and b) an inner surface including an undercut extending continuously below said peripheral top surface.

2. The invention described in claim 1 wherein said sidewall extends along three sides of said base periphery.

3. The invention described in claim 1 wherein said peripheral top surface comprises a "C" shaped configuration.

4. The invention described in claim 1 wherein said undercut is a curvilinear surface.

5. The invention described in claim 4 wherein said curvilinear surface comprises a first arcuate surface below said peripheral top surface, a second arcuate surface tangent to said base surface against which said liquid strum impacts, and a transitional surface extending between said first arcuate surface and said second arcuate surface.

6. The invention described in claim 1 wherein said undercut is a planar surface below said peripheral top surface, said planar surface being sloped at an angle θ of between 45° and 75°.

7. An impact pad for reversing the direction of a fluid flow generated by an incoming liquid stream, said impact pad comprising: a base having a surface against which said liquid stream impacts, a first sidewall extending in an upward direction along a first edge of said base, and a second sidewall extending in an upward direction along a second edge of said base, said first sidewall and said second sidewall being opposite hand, and said first and said second sidewall each including;

a) a first end, a second end remote from said first end, and a top surface, and b) an inner surface including an undercut extending continuously below said top surface, said undercut including a curvilinear surface having a first arcuate surface below said top surface, a second arcuate surface tangent to said base surface against which said liquid stream impacts, and a transitional surface extending between said first and said second arcuate surfaces.

8. An impact pad for reversing the direction of a fluid flow generated by an incoming liquid stream, said impact pad comprising: a base having a surface against which said liquid stream impacts, a first sidewall extending in an upward direction along a first edge of said base, and a second sidewall extending in an upward direction along a second edge of said base, said first sidewall and said second sidewall being opposite hand, and said first and said second sidewall each including;

a) a first end, a second end remote from said first end, and a top surface, and b) an inner surface including an undercut extending continuously below said top surface, said undercut being a planar surface sloped at an angle θ of between 45° and 75°.

9. In a continuous caster tundish for containing a reservoir of molten metal having an asymmetrical fluid flow generated by an incoming ladle stream, the tundish including first end wall, a second end wall, sidewalls and a floor, said floor having one or more well blocks located near said first end wall, and said floor including a ladle stream impact area positioned proximate said second end wall, wherein the improvement comprises an impact pad for reversing the direction of said fluid flow generated by said incoming ladle stream comprising: a base having a surface against which said liquid stream impacts, a peripheral top surface to expose said base, and a sidewall extending in an upward direction along the periphery of said base, said sidewall extending between said base and said peripheral top surface and including;

a) a first end, a second end remote from said first end, and b) an inner surface including an undercut extending continuously below said peripheral top surface.

10. The invention described in claim 9 wherein said sidewall extends along three sides of said base periphery.

11. The invention described in claim 9 wherein said peripheral top surface comprises a "C" shaped configuration.

12. The invention described in claim 9 wherein said first end and said second end remote from said first end provide a fluid flow outlet, said outlet being located along said base portion adjacent the well blocks of the tundish.

13. The invention described in claim 9 wherein said undercut is a curvilinear surface.

14. The invention described in claim 13 wherein said curvilinear surface comprises a first arcuate surface below said peripheral top surface, a second arcuate surface remote from said first arcuate surface and tangent to said base surface against which said liquid stream impacts, and a transitional surface extending between said first arcuate surface and said second arcuate surface.

15. The invention described in claim 14 wherein a height "H" of said curvilinear surface is ≧ the inside diameter of said tubular ladle shroud.

16. The invention described in claim 9 wherein said undercut is a planar surface below said peripheral top surface, said planar surface being sloped at an angle θ of between 45° and 75°.

17. The invention described in claim 16 wherein a height "H" of said planar surface is ≧ the inside diameter of said tubular ladle shroud.

18. The invention described in claim 16 wherein said base surface against which said liquid stream impacts is sloped in a downward direction from said second tundish end wall toward said tundish floor.

19. In a continuous caster tundish for containing a reservoir of molten metal having a symmetrical fluid flow generated by an incoming ladle stream, the tundish including a first sidewall, a second sidewall, end walls and a floor, said floor having two or more well blocks spaced along the length thereof, and said floor including a ladle stream impact area positioned between adjacent well blocks, wherein the improvement comprises an impact pad for reversing the direction of said fluid flow generated by said incoming ladle stream comprising: a base having a surface against which said liquid stream impacts, a first sidewall extending in an upward direction along a first edge of said base, and a second sidewall extending in an upward direction along a second edge of said base, said first sidewall and said second sidewall being opposite hand, and said first and said second sidewall each including;

a) a first end, a second end remote from said first end, and a top surface, and b) an inner surface including an undercut extending continuously below said top surface, said undercut including a curvilinear surface having a first arcuate surface below said top surface, a second arcuate surface tangent to said base surface against which said liquid stream impacts, and a transitional surface extending between said first and said second arcuate surfaces.

20. The invention described in claim 19 wherein a height "H" of said curvilinear undercut is ≧ the inside diameter of said ladle shroud.

21. In a continuous caster tundish for containing a reservoir of molten metal having a symmetrical fluid flow generated by an incoming ladle stream, the tundish including a first sidewall, a second sidewall, end walls and a floor, said floor having two or more well blocks spaced along the length thereof, and said floor including a ladle stream impact area positioned between adjacent well blocks, wherein the improvement comprises an impact pad for reversing the direction of said fluid flow generated by said incoming ladle stream comprising: a base having a surface against which said liquid stream impacts, a first sidewall extending in an upward direction along a first edge of said base, and a second sidewall extending in an upward direction along a second edge of said base, said first sidewall and said second sidewall being opposite hand, and said first and said second sidewall each including;

a) a first end, a second end remote from said first end, and a top surface, and b) an inner surface including an undercut extending continuously below said top surface, said undercut being a planar surface sloped at an angle θ of between 45° and 75°.

22. The invention described in claim 20 wherein a height "H" of said curvilinear undercut is ≧ the inside diameter of said ladle shroud.

*23. An impact pad, comprising: a base having a surface against which an incoming ladle stream impacts and upon which the fluid thereof flows, a peripheral top surface to expose said base, and a side wall extending in an upward direction along the periphery of said base, said side wall extending between said base and said peripheral top surface and including an inner surface having an undercut extending continuously below said peripheral top surface so that the fluid flow of the ladle stream is forced into a reversed direction back toward the incoming ladle stream.*

*24. The invention described in claim 23 wherein said undercut is a curvilinear surface.*

*25. The invention described in claim 24 wherein said curvilinear surface comprises a first arcuate surface below said peripheral top surface, a second arcuate surface remote from said first arcuate surface and tangent to said base surface against which said incoming ladle stream impacts, and a transitional surface extending between said first arcuate surface and said second arcuate surface.*

*26. The invention described in claim 23 wherein said undercut is a planar surface below said peripheral top surface, said planar surface being sloped at an angle ϕ of between 45° and 75°.*

*27. In a continuous caster tundish for containing a reservoir of molten metal having fluid flow generated by an incoming ladle stream, the tundish including a first end wall, a second end wall, sidewalls, and a floor, said floor including at least one well block for discharging molten metal from the continuous caster tundish, and the floor including an impact area to receive the incoming ladle stream, the impact area positioned proximate a shroud introducing the incoming ladle stream, wherein the improvement comprises an impact pad located in the impact area for reversing the direction of the fluid flow generated by the incoming ladle stream comprising: a base having a surface against which the incoming ladle stream impacts, a peripheral top surface to expose said base, and a sidewall extending in an upward direction along the periphery of said base, said sidewall extending between said base and said peripheral top surface*

*and including an inner surface having an undercut extending continuously below said peripheral top surface so that fluid flow of the ladle stream is forced into a reversed direction back toward the incoming ladle stream.*

*28. The invention described in claim 27 wherein said undercut is a curvilinear surface.*

*29. The invention described in claim 28 wherein said curvilinear surface comprises a first arcuate surface below said peripheral top surface, a second arcuate surface remote from said fast arcuate surface and tangent to said base surface against which said incoming ladle stream impacts, and a transitional surface extending between said first arcuate surface and said second arcuate surface.*

*30. The invention described in claim 29 wherein said shroud is tubular and the height "H" of said curvilinear surface is ≧ the inside diameter of said shroud.*

*31. The invention described in claim 27 wherein said undercut is a planar surface below said peripheral top surface, said planar surface being sloped at an angle ϕ of between 45° and 75°.*

*32. The invention described in claim 31 wherein said shroud is tubular and the height "H" of said planar surface is ≧ the inside diameter of said shroud.*

*33. The invention described in claim 31 wherein said base surface against which said incoming ladle stream impacts is sloped in a downward direction from a tundish end wall toward said tundish floor.*

*34. An impact pad for reversing the direction of fluid flow generated by an incoming ladle stream, said impact pad comprising: a base having a surface against which an incoming ladle stream impacts, a peripheral top surface to expose said base, and a sidewall extending in an upward direction along the periphery of said base, said sidewall extending between said base and said peripheral top surface and including an inner surface having an undercut for receiving and reversing the direction of a fluid flow generated by the incoming ladle stream.*

*35. The impact pad of claim 34, wherein:*

*a) said undercut is arcuate.*

*36. The impact pad of claim 34, wherein:*

*a) said undercut is planar.*

*37. The impact pad of claim 34, wherein:*

*a) said sidewall extends partially about said base.*

*38. The impact pad of claim 37, wherein:*

*a) said sidewall has first and second remote ends forming therebetween an opening through which the fluid flow may flow.*

*39. The impact pad of claims 35 or 36, wherein:*

*a) said undercut extends along the length of said inner surface.*

*40. The impact pad of claim 34, wherein:*

*a) said peripheral top surface is C-shaped in plan.*

*41. The impact pad of claim 34, wherein:*

*a) said base is rectangular in plan, and*

*b) there are two sidewalls, each sidewall extending along an edge of said base and said sidewalls extending in parallel.*

*42. An impact pad for reversing the direction of a fluid flow generated by an incoming ladle stream, said impact pad comprising: a base having a surface against which an incoming ladle stream impacts, a peripheral top surface to expose said base, and a sidewall extending from said base in an upward direction, said sidewall extending between said base and said peripheral top surface and including an inner surface having an undercut extending below said peripheral top surface for receiving and reversing the direction of a fluid flow generated by the incoming ladle stream.*

*43. The impact pad of claim 42, wherein:*

*a) said undercut is arcuate.*

*44. The impact pad of claim 42, wherein:*

*a) said undercut is planar.*

*45. The impact pad of claims 43 or 44, wherein:*

*a) said undercut extends along the length of said inner surface.*

*46. The impact pad of claim 45, wherein:*

*a) said sidewall extends partially about said base.*

*47. The impact pad of claim 46, wherein:*

*a) said sidewall is peripherally disposed about said base.*

* * * * *